United States Patent
Slavens et al.

(10) Patent No.: US 10,247,419 B2
(45) Date of Patent: Apr. 2, 2019

(54) COMBUSTOR LINER PANEL WITH A MULTIPLE OF HEAT TRANSFER RIBS FOR A GAS TURBINE ENGINE COMBUSTOR

(71) Applicant: United Technologies Corporation, Farmington, CT (US)

(72) Inventors: Thomas N. Slavens, Norman, OK (US); Mark F. Zelesky, Bolton, CT (US); Andrew D. Burdick, Somers, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/665,837

(22) Filed: Aug. 1, 2017

(65) Prior Publication Data
US 2019/0041059 A1    Feb. 7, 2019

(51) Int. Cl.
| | | |
|---|---|---|
| *F23R 3/04* | (2006.01) | |
| *F02C 7/18* | (2006.01) | |
| *F23R 3/00* | (2006.01) | |
| *F23R 3/60* | (2006.01) | |
| *F02C 3/06* | (2006.01) | |
| *F02K 3/06* | (2006.01) | |

(52) U.S. Cl.
CPC .................. *F23R 3/04* (2013.01); *F02C 7/18* (2013.01); *F23R 3/002* (2013.01); *F23R 3/60* (2013.01); *F02C 3/06* (2013.01); *F02K 3/06* (2013.01); *F05D 2220/32* (2013.01); *F05D 2240/35* (2013.01); *F05D 2250/141* (2013.01); *F05D 2250/323* (2013.01); *F05D 2260/202* (2013.01); *F05D 2260/22141* (2013.01); *F23R 2900/03042* (2013.01)

(58) Field of Classification Search
CPC .. F23R 3/002; F23R 3/60; F23R 2900/03041; F23R 2900/03042; F23R 2900/03043; F23R 2900/03044; F23R 2900/03045; F05D 2260/22141

See application file for complete search history.

(56) References Cited

U.S. PATENT DOCUMENTS

| | | |
|---|---|---|
| 4,302,940 A | 12/1981 | Meginnis |
| 6,612,808 B2 * | 9/2003 | Lee .......................... F01D 5/187 |
| | | 415/175 |
| 6,761,031 B2 | 7/2004 | Bunker |

(Continued)

FOREIGN PATENT DOCUMENTS

WO    2015/108584 A2    7/2015

OTHER PUBLICATIONS

European Search Report dated Oct. 31, 2018 for corresponding European Patent Application No. 18186910.8.

*Primary Examiner* — Carlos A Rivera
(74) *Attorney, Agent, or Firm* — Bachman & LaPointe, P.C.

(57) ABSTRACT

A liner panel for use in a combustor of a gas turbine engine, including a multiple of heat transfer ribs located in at least one discrete area of the liner panel. A wall assembly within a gas turbine engine including a support shell, a liner panel mounted to the support shell via a multiple of studs and a multiple of heat transfer ribs located in at least one discrete area on a cold side of the liner panel, each of the multiple of heat transfer ribs account for the multiple of studs.

13 Claims, 12 Drawing Sheets

(56) References Cited

U.S. PATENT DOCUMENTS

| | | | |
|---|---|---|---|
| 8,220,273 B2* | 7/2012 | Iwasaki | F23R 3/005 60/752 |
| 8,499,566 B2 | 8/2013 | Lacy et al. | |
| 2015/0345789 A1* | 12/2015 | Papple | F23R 3/10 60/772 |
| 2015/0354821 A1 | 12/2015 | Cunha | |

* cited by examiner

Vented Ribs

Baseline

COMBUSTOR LINER PANEL WITH A MULTIPLE OF HEAT TRANSFER RIBS FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels.

In typical combustor chamber designs, the liner panels have a hot side exposed to the gas path. The opposite, or cold side, has features such as cast in threaded studs to mount the liner panel and a full perimeter rail that contact the inner surface of the liner shells. Testing has shown that the traditional cooling patterns may not be sufficient to provide effective thermal protection to all areas of the liner panel array with the ongoing lower emissions requirements and higher combustor operational temperatures.

SUMMARY

A liner panel for a combustor of a gas turbine engine according to one disclosed non-limiting embodiment of the present disclosure includes a multiple of heat transfer ribs that extend from a cold side of the liner panel, each of the multiple of heat transfer ribs including a multiple of cooling holes.

A further aspect of the present disclosure includes that the multiple of cooling holes extend through the liner panel and follow a direction of the respective heat transfer rib through which the multiple of cooling holes pass.

A further aspect of the present disclosure includes that the multiple of heat transfer ribs are located in response to a pressure field.

A further aspect of the present disclosure includes that the multiple of heat transfer ribs are located in response to a pressure field on a hot side of the liner panel.

A further aspect of the present disclosure includes that the multiple of heat transfer ribs avoids cold side structures.

A further aspect of the present disclosure includes that the cold side structures include a mount stud.

A further aspect of the present disclosure includes that the multiple of heat transfer ribs form a semi-circular pattern around a mount stud.

A further aspect of the present disclosure includes that the multiple of heat transfer ribs form a converging pattern downstream of a first mount stud.

A further aspect of the present disclosure includes that the converging pattern converges between two mount studs.

A further aspect of the present disclosure includes that the converging pattern is located on both sides of a semi-circular pattern around a mount stud.

A further aspect of the present disclosure includes that each of the multiple of heat transfer ribs are about 0.040 (1 mm) in width.

A further aspect of the present disclosure includes that each of the multiple of heat transfer ribs are about 0.033 inches (0.84 mm) in height.

A further aspect of the present disclosure includes that each of the multiple of heat transfer ribs are spaced about 0.040 (1 mm) center to center.

A further aspect of the present disclosure includes that each of the multiple of cooling holes are defined along a direction vector directed at an angle to the cold side.

A further aspect of the present disclosure includes that each of the multiple of cooling holes are defined along the direction vector to generally follow the respective heat transfer rib.

A wall assembly within a gas turbine engine according to one disclosed non-limiting embodiment of the present disclosure includes a support shell; a liner panel mounted to the support shell via a multiple of studs that extend from a cold side of the liner panel; and a multiple of heat transfer ribs located in at least one discrete area on a cold side of the liner panel.

A further aspect of the present disclosure includes a film cooling hole defined along a direction vector directed at an angle to penetrate a hot side of the liner panel, the direction vector oriented to generally follow the respective heat transfer rib.

A further aspect of the present disclosure includes that the multiple of heat transfer ribs form a semi-circular pattern around a mount stud.

A further aspect of the present disclosure includes that the multiple of heat transfer ribs form a converging pattern downstream of the mount stud, the converging pattern converges between two downstream mount studs.

A further aspect of the present disclosure includes that the converging pattern is located adjacent to the semi-circular pattern.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
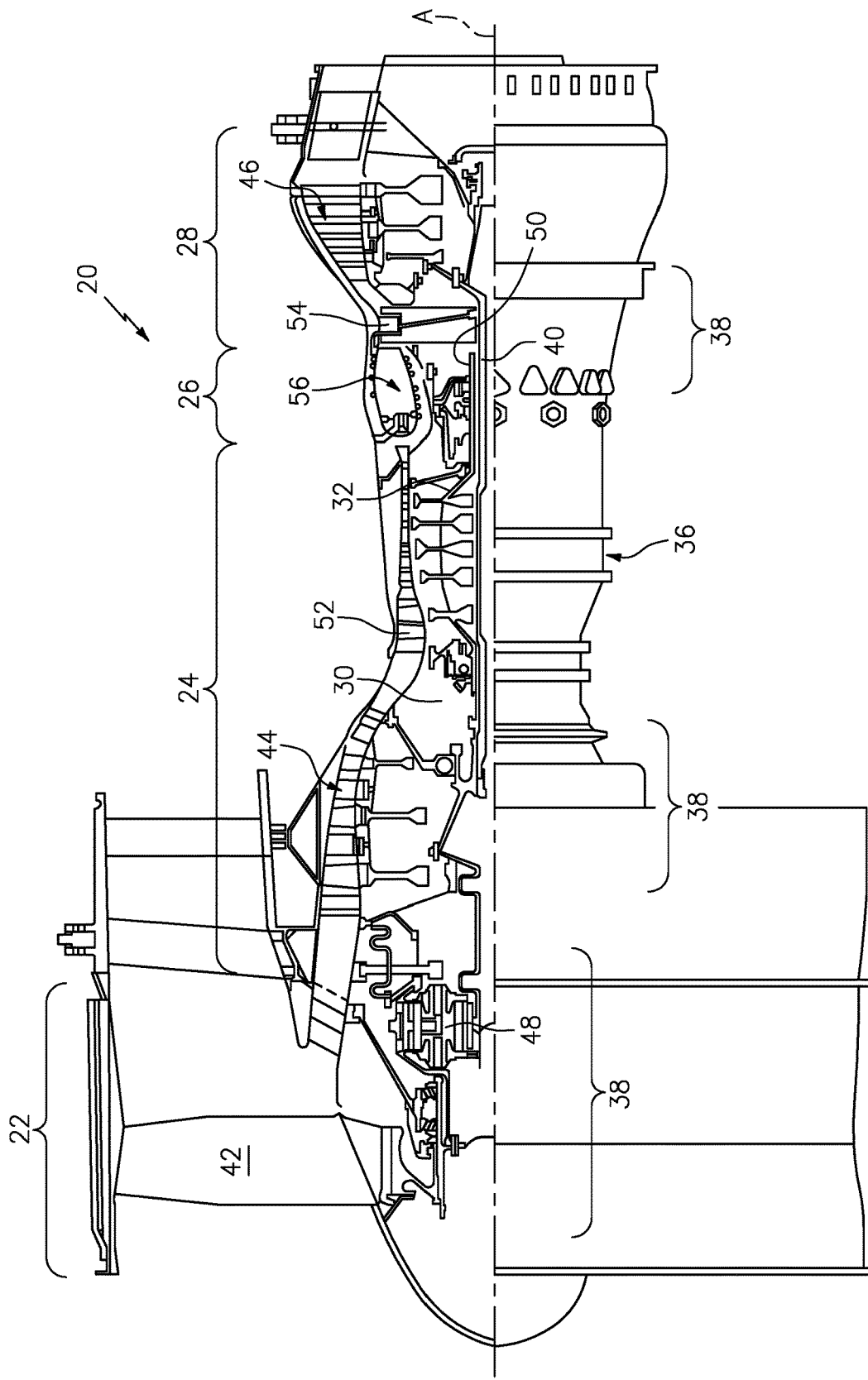
FIG. 1 is a schematic cross-section of an example gas turbine engine architecture.

FIG. 1 schematically illustrates a gas turbine engine 20. The gas turbine engine 20 as disclosed herein has a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate around the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

Figure 2:
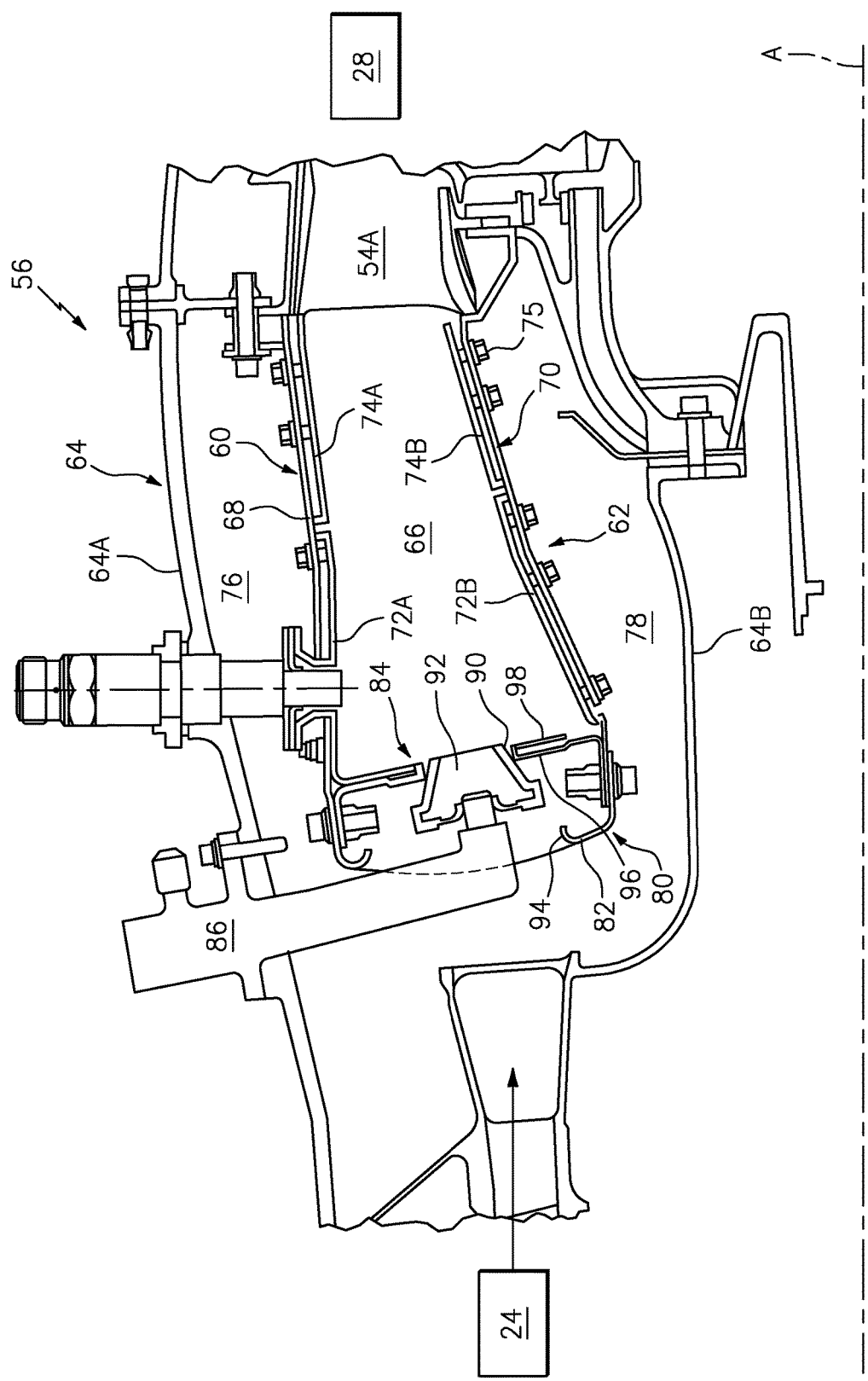
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic, or other temperature resistant material. In one disclosed non-limiting embodiment, the outer wall assembly 60 includes a multiple of forward outer liner panels 72A, and a multiple of aft outer liner panels 72B that are circumferentially staggered to line the outer shell 68. A multiple of forward inner liner panels 74A and a multiple of aft inner liner panels 74B are circumferentially staggered to line the inner shell 70 of the inner wall assembly 62.

The combustor 56 further includes a forward assembly 80 downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 and a respective hood port 94.

The bulkhead assembly 84 includes a bulkhead support shell 96 secured to the combustor wall assemblies 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forward most ends of the combustor wall assemblies 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 into the swirler opening 92.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner wall assemblies 60, 62 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
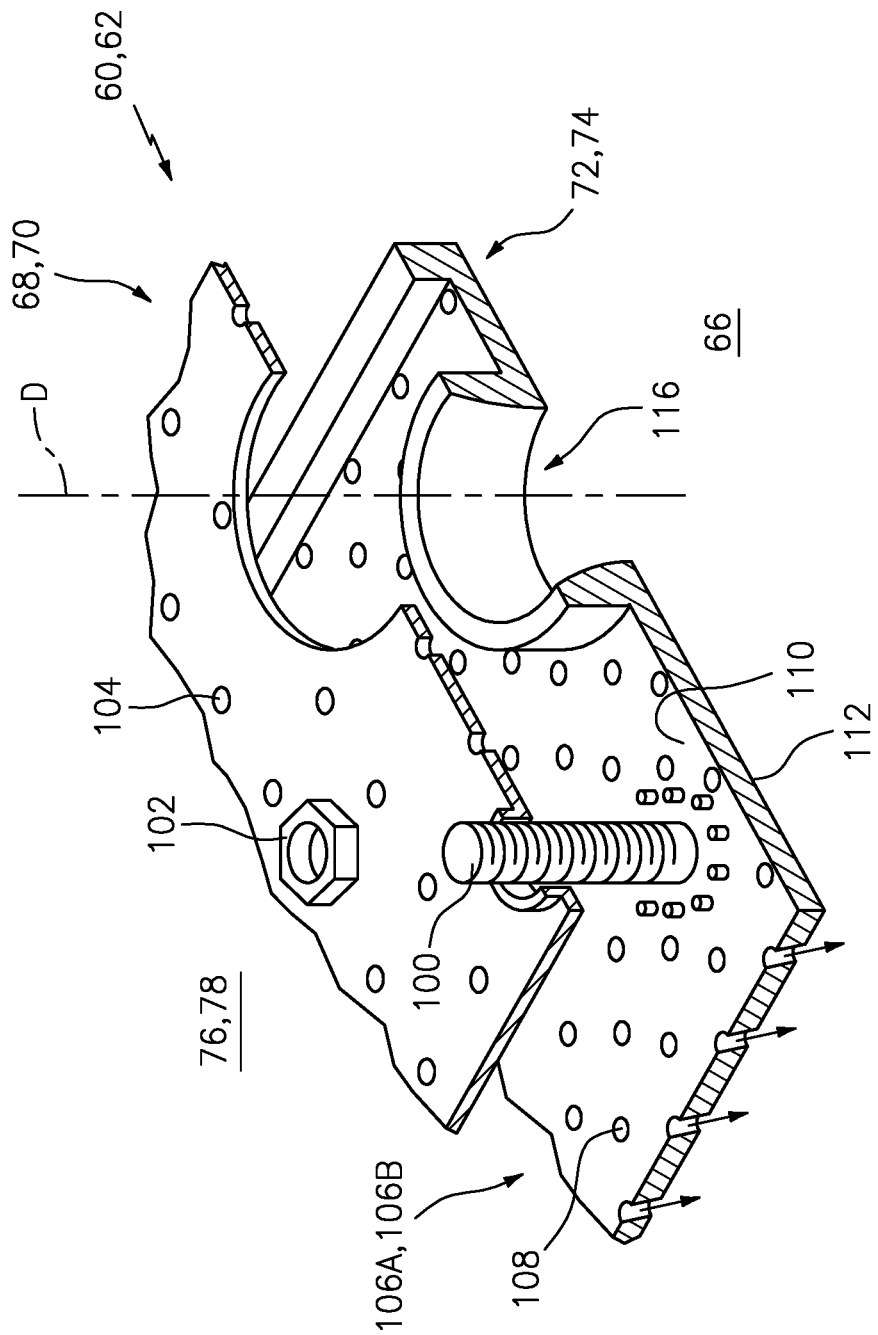
FIG. 3 is an exploded partial sectional view of a portion of a combustor wall assembly.

With reference to FIG. 3, a multiple of threaded mount studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via convection.

A multiple of effusion passages 108 penetrate through each of the liner panels 72, 74. The geometry of the passages, e.g., diameter, shape, density, surface angle, incidence angle, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
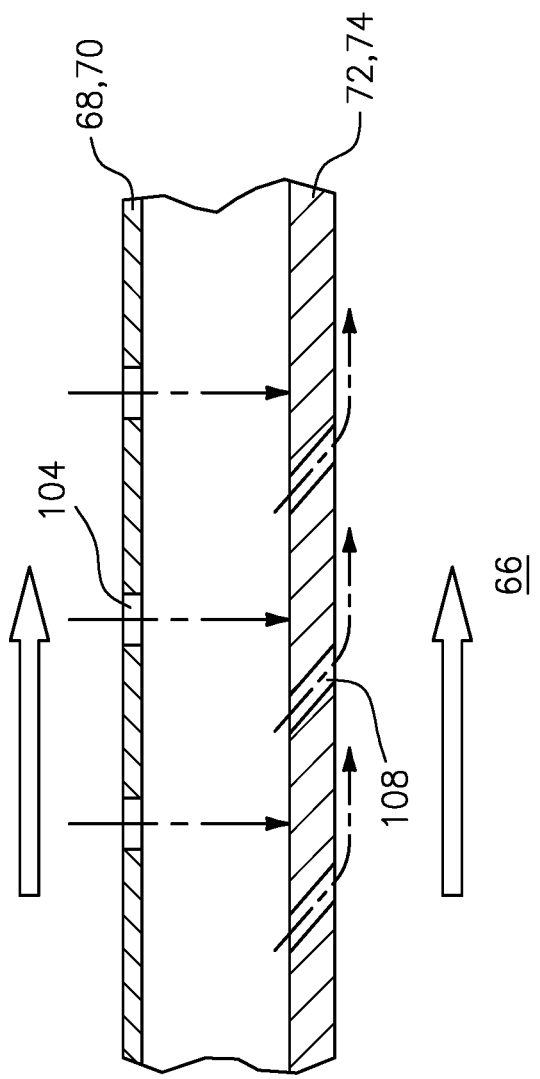
FIG. 6 is a sectional view of a portion of a combustor wall assembly showing an impingement and film cooling airflow.

In one disclosed non-limiting embodiment, each of the multiple of effusion passages 108 are typically about 0.025" (0.635 mm) in diameter and define a surface angle of about thirty (30) degrees with respect to the cold side 110 of the liner panels 72, 74. The effusion passages 108 are generally more numerous than the impingement passages 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement passages 104 and effusion passages 108 may be referred to as an impingement and effusion-cooled float wall panel assembly. A multiple of dilution passages 116 are located in the liner panels 72, 74 each along a common axis D. For example, the dilution passages 116 are located in a circumferential line W (shown partially in FIG. 4). Although the dilution passages 116 are illustrated in the disclosed non-limiting embodiment as within the aft liner panels 74A, 74B, the dilution passages may alternatively be located in the forward liner panels 72A, 72B or in a single liner panel which replaces the fore/aft liner panel array. Further, the dilution passages 116, although illustrated in the disclosed non-limiting embodiment as integrally formed in the liner panels, may be separate components. Whether integrally formed or separate components, the dilution passages 116 may be referred to as grommets.

This dilution air is not primarily used for cooling of the metal surfaces of the combustor shells or panels, but to condition the combustion products within the combustion chamber 66.

Figure 4:
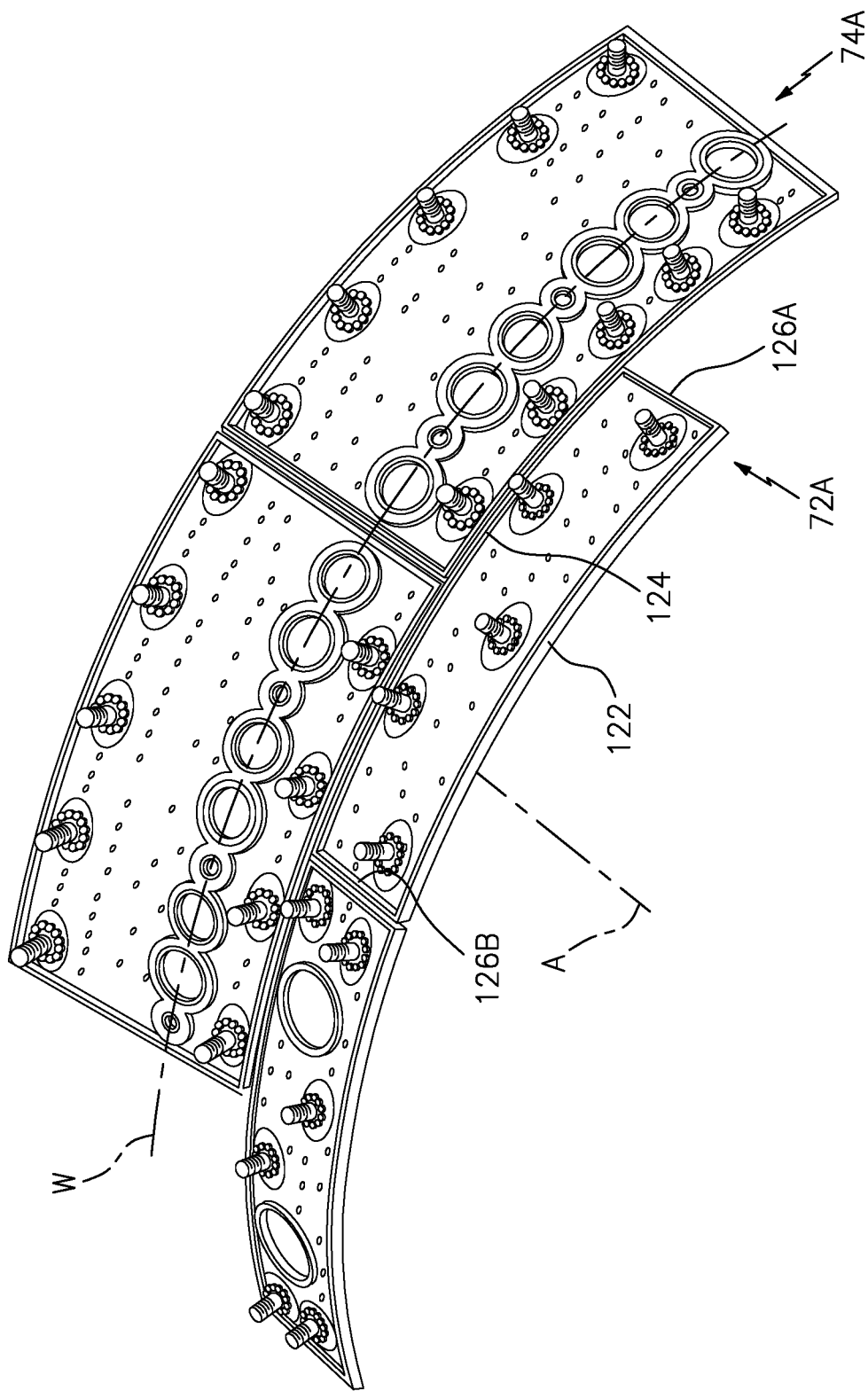
FIG. 4 is a perspective cold side view of a portion of a liner panel array.
Figure 5:
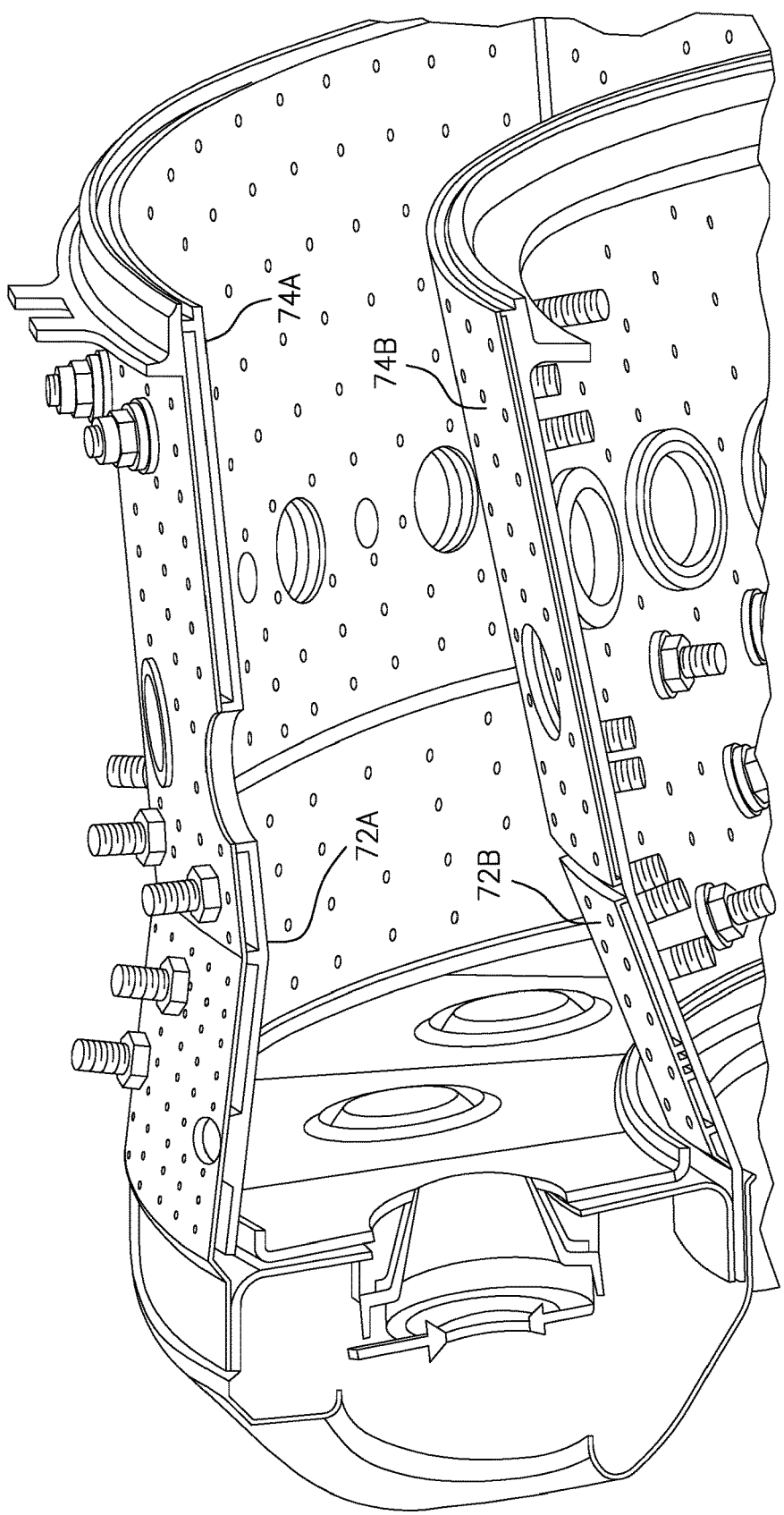
FIG. 5 is a perspective partial sectional view of the combustor.
Figure 7:
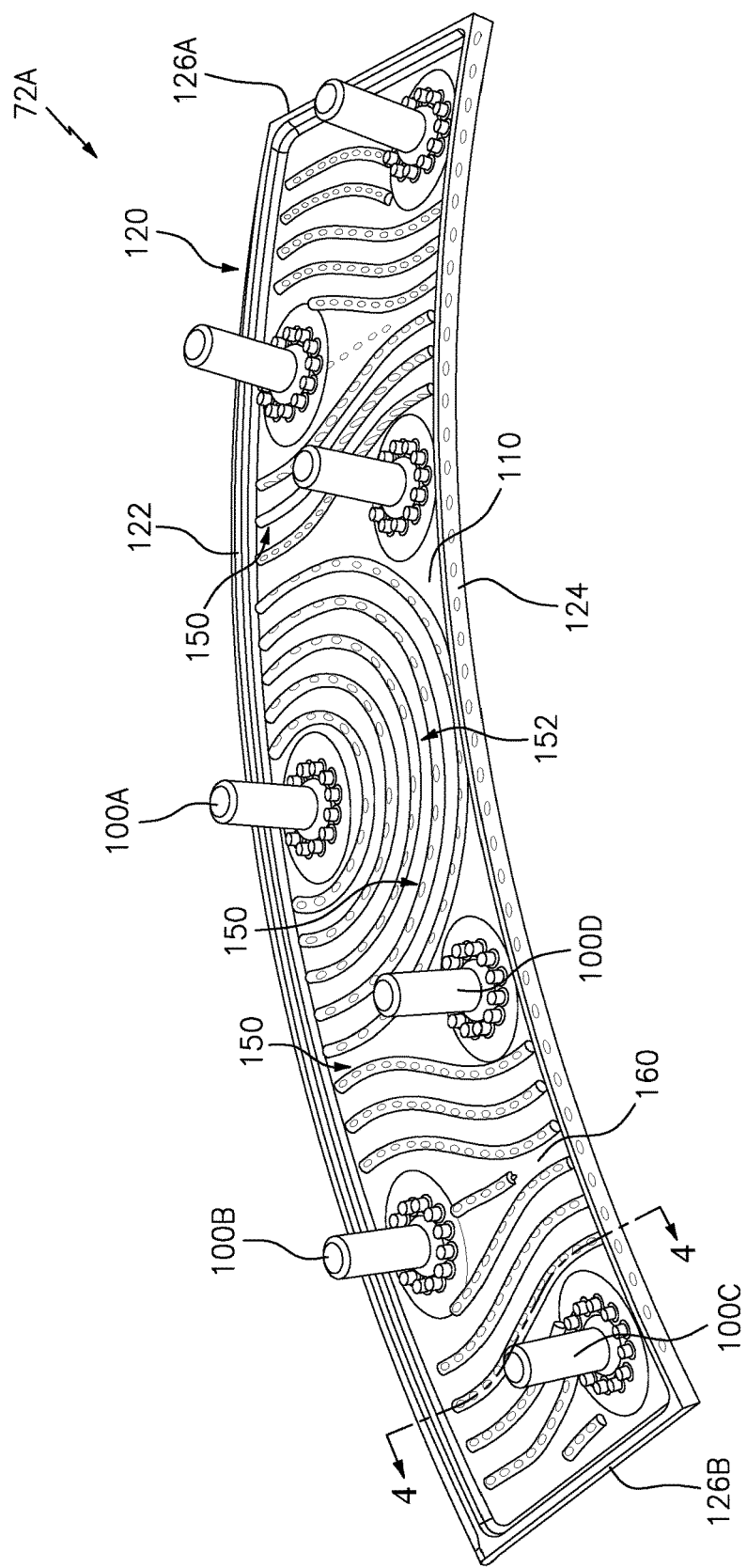
FIG. 7 is a perspective view of a cold side of a forward liner panel with a heat transfer rib according to one disclosed non-limiting embodiment.

With reference to FIG. 4, in one disclosed non-limiting embodiment, each of the liner panels 72A, 74A, 72B, 74B in the liner panel array includes a perimeter rail 120. In the illustrated embodiment, the forward outer liner panel 72A is discussed in detail; however, such description is applicable to every liner panel 72A, 74A, 72B, 74B. The perimeter rail 120 may be formed by a forward circumferential rail 122, an aft circumferential rail 124, and axial rails 126A, 126B, that interconnect the forward and aft circumferential rail 122, 124 (FIG. 7). The perimeter rail 120 seals each liner panel with respect to the respective support shell 68, 70 to form the impingement cavity 106 there between. That is, the forward and aft circumferential rail 122, 124 are located at relatively constant curvature shell interfaces while the axial rails 126 extend across an axial length of the respective support shell 68, 70 to complete the perimeter rail 120 that seals the liner panels 72, 74 to the respective support shell 68, 70.

A multiple of studs 100 are located adjacent to the respective forward circumferential rail 122 and the aft circumferential rail 124. Each of the studs 100 may be at least partially surrounded by posts 130 to at least partially support the fastener 102 and provide a stand-off between each liner panels 72B, 74B and respective support shell 68, 70.

Figure 8:
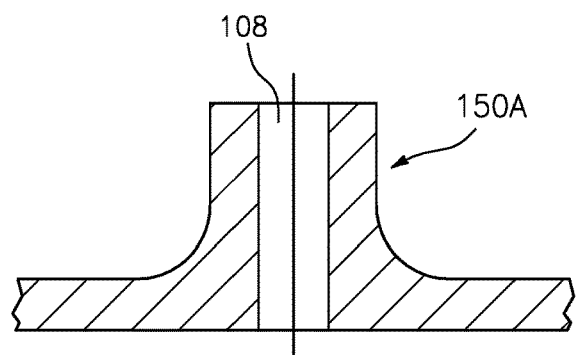
FIG. 8 is a cross-sectional view of a heat transfer rib according to one disclosed non-limiting embodiment.
Figure 9:
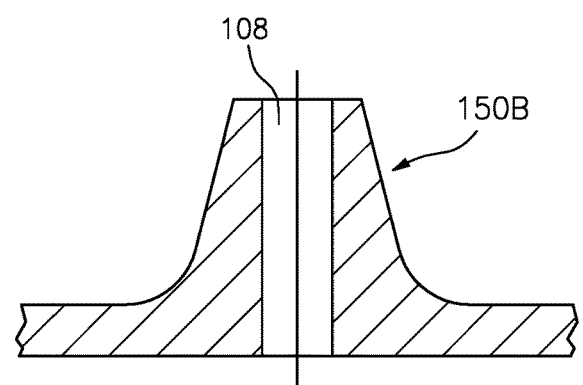
FIG. 9 is a cross-sectional view of a heat transfer rib according to one disclosed non-limiting embodiment.
Figure 10:
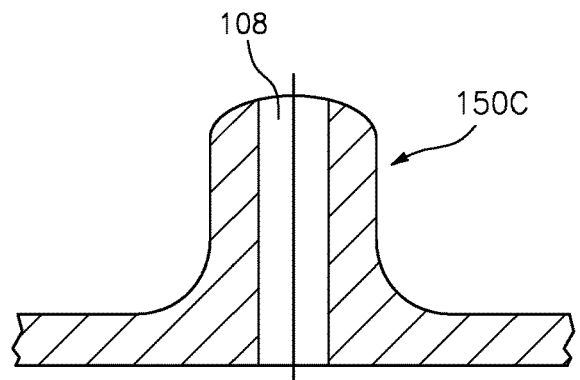
FIG. 10 is a cross-sectional view of a heat transfer rib according to one disclosed non-limiting embodiment.
Figure 11:
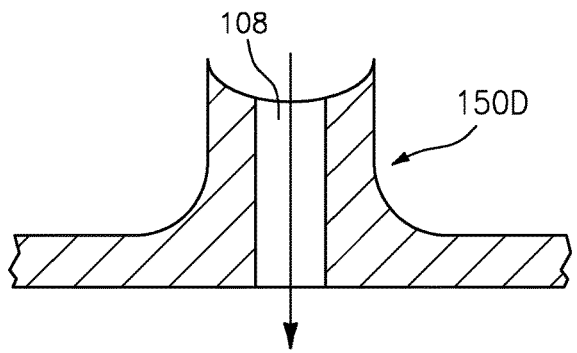
FIG. 11 is a cross-sectional view of a heat transfer rib according to one disclosed non-limiting embodiment.

With reference to FIG. 7, a single example outer forward liner panel 72A is illustrated in this disclosed embodiment, however, every, or particular, liner panels may benefit herefrom. In this embodiment, the forward liner panel 72A includes a multiple of heat transfer ribs 150 on the cold side 110 thereof. The multiple of heat transfer ribs 150 may be of various cross sections, such as rectilinear 150A (FIG. 8), tapered 150B (FIG. 9), curved (FIG. 10), undercut (FIG. 11), or other such geometries.

The liner panels 72, 74 may be manufactured via casting, an additive manufacturing process, or other process that facilitates incorporation of the relatively small heat transfer ribs 150 as well as other features. Alternatively, the liner panels 72, 74 may be manufactured using digital twin technology to attain high precision transfer of specific part geometry between manufacturing processes. Here, during build-up of the liner panel, in situ data acquisition records variances in part geometry and reflects that into a digital CAD part "twin." This part is then used to define laser machining tooling paths. The laser machining paths are adjusted to align to the ribs compensating for variation from the casting or additive build process.

The size and spacing of the heat transfer ribs 150 may be constructed such that the increase in backside impingement area 110 overcomes the additional mass of the heat transfer ribs 150 within the wall in terms of impact to gas-side metal temperatures. In this fashion, the heat transfer ribs 150 operate as other backside treatments, such as pin-fins, whose increase in backside convective heat flux is much higher than the thermal resistance introduced by wall thickness increase. In one example, each of the multiple of heat transfer ribs are about 0.040 (1 mm) in width, about 0.020 to 0.040 inches (0.5-1 mm) in height, and may be spaced apart at 1.5-5.5× their diameter center to center. In one example, the example dimensions may vary between +/−50%. In regions where the pressure is higher within the gas-path and locally depress through flow through holes 108, the spacing would be tightened to increase both the amount of backside cooling augmentation and the number of holes 108 ejecting in this location.

Figure 12:
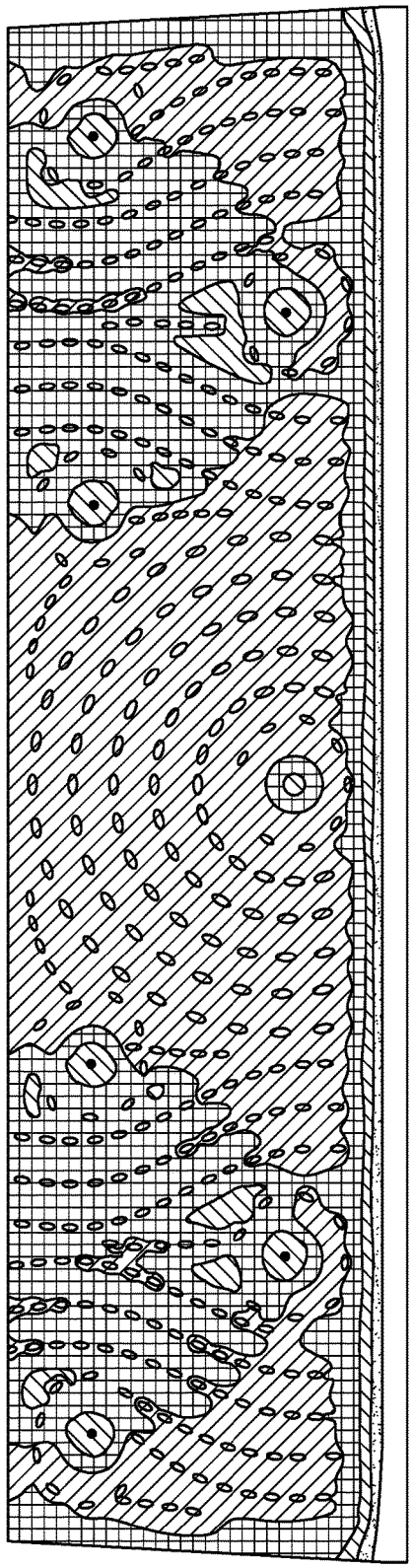
FIG. 12 is a perspective view of a hot side of the forward liner panel with the heat transfer ribs showing a thermal distribution pattern.
Figure 13:
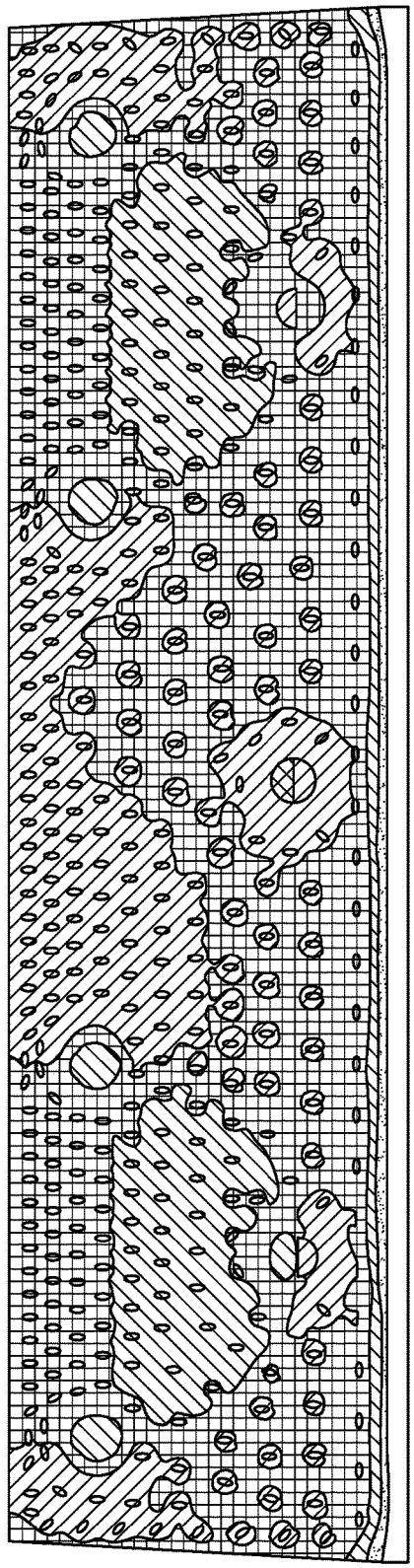
FIG. 13 is a PRIOR ART perspective view of a hot side of a forward liner panel showing a thermal distribution pattern without the heat transfer ribs of FIG. 12.

The multiple of heat transfer ribs 150 may be located in response to a pressure field (FIG. 12) on the hot side 112 of the forward liner panel 72A. For example, via computational fluid dynamic (CFD) modeling and/or test data, the pressure regions within the combustion chamber 66 are determined (FIG. 13 prior art) to locate the multiple of heat transfer ribs 150. Typically, the higher the pressure, the higher the temperature, (FIG. 10) and thus a greater number of heat transfer ribs 150 may be provided. In addition, identification of the pressure field permits the multiple of heat transfer ribs 150 to flow therewith. The contour and continuity of the multiple of heat transfer ribs 150 facilitate heat transfer as the multiple of heat transfer ribs 150 form continuous structures that account for cold side structures (e.g., mount studs 100). That is, the multiple of heat transfer ribs 150 avoid cold side structures and may converge to regions of high heat load.

The multiple of heat transfer ribs 150, for example, may form a hem-circular pattern 152 around a central mount stud 100A that expands from an aft circumferential rail 124. The multiple of heat transfer ribs 150 may also form a converging pattern 160 downstream of a first mount stud 100B which then converge between two studs 100C, 100D. The converging pattern may be located on both sides of the semi-circular pattern 152.

Figure 14:
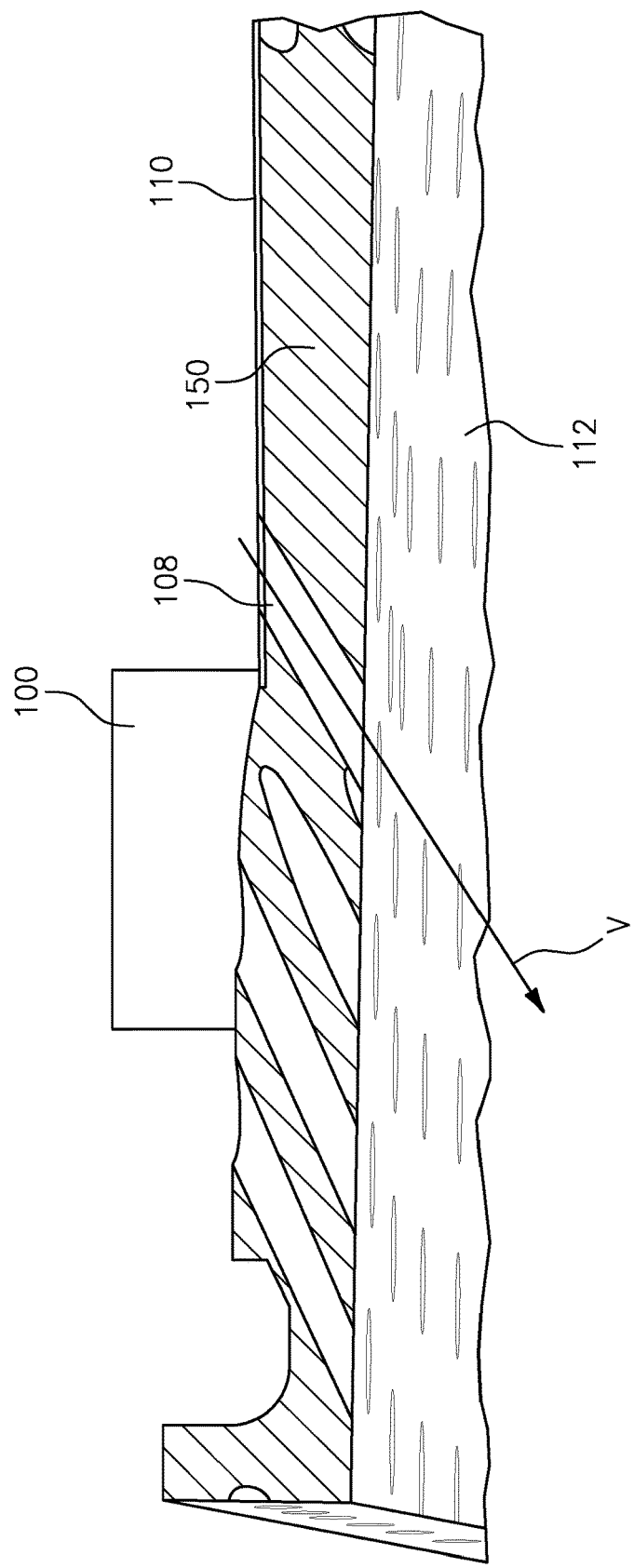
FIG. 14 is an expanded cross-sectional view of a heat transfer rib according to one disclosed non-limiting embodiment showing a vector of the cooling holes through the heat transfer rib.
Figure 15:
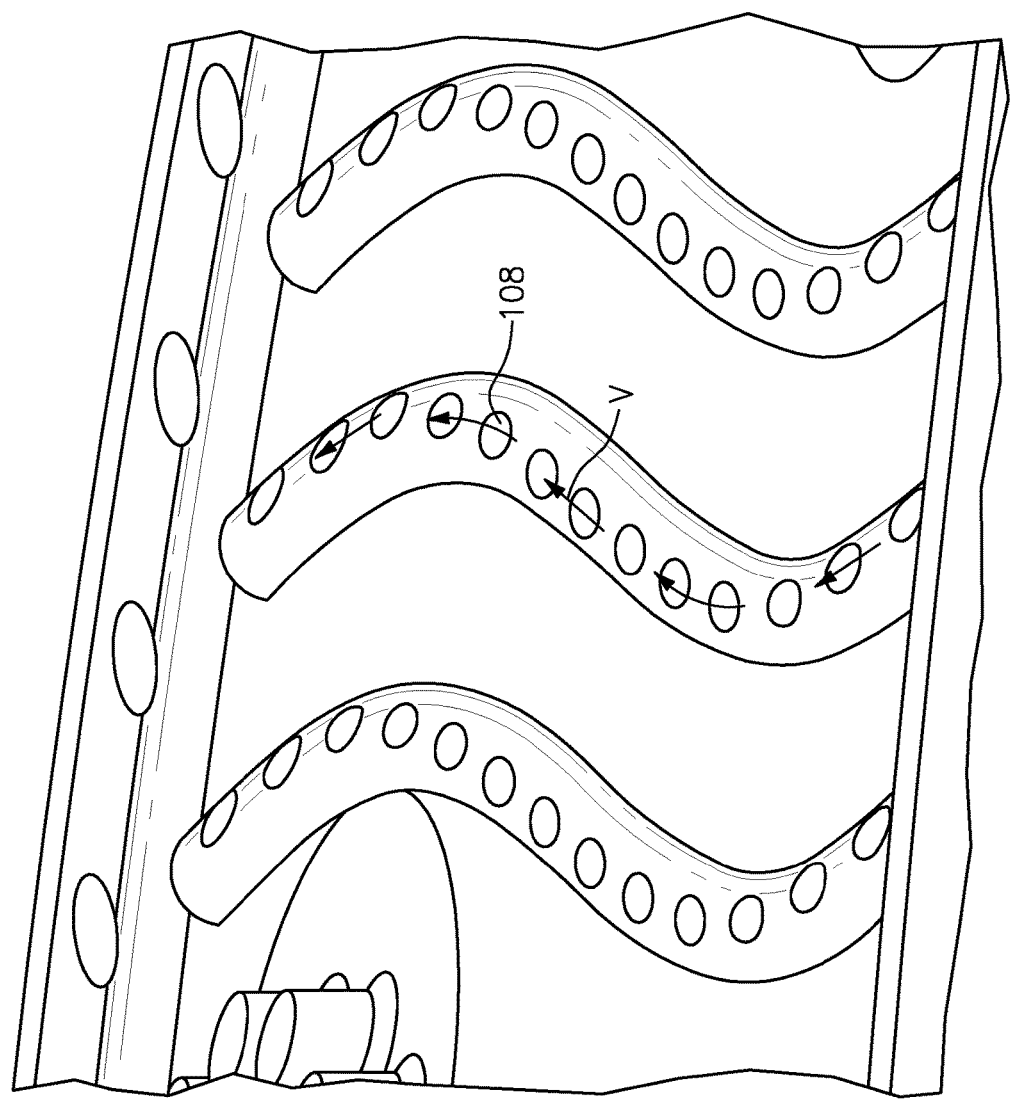
FIG. 15 is an expanded perspective view of the heat transfer ribs according to one disclosed non-limiting embodiment showing the vector of the cooling holes which follow the path of the heat transfer rib.
Figure 16:
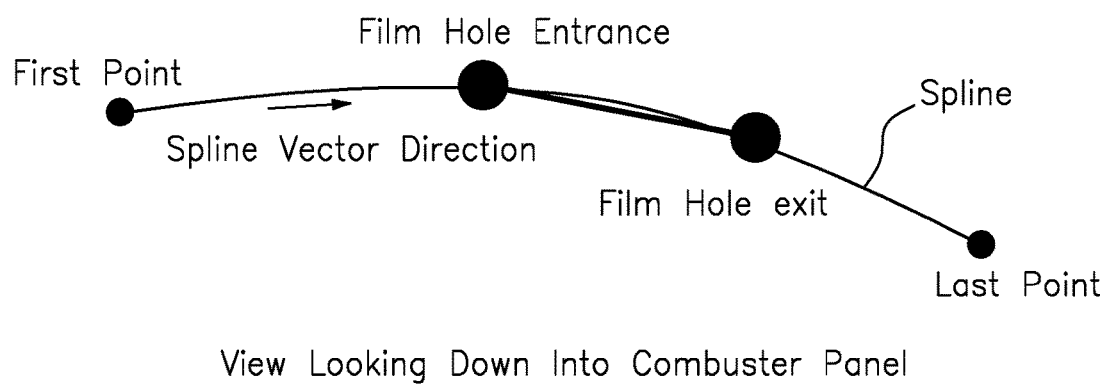
FIG. 16 is schematic view of the heat transfer ribs according to one disclosed non-limiting embodiment showing the vector of the cooling holes which follow the path of the heat transfer rib.

With reference to FIG. 14, the multiple of heat transfer ribs 150 have cooling holes 108 that are drilled (e.g., laser drilled or additively manufactured) through the respective heat transfer rib 150. That is, the cooling holes 108 are drilled though the respective heat transfer ribs 150 (FIG. 15). Each cooling hole 108 defines a direction vector V through the respective heat transfer rib 150. The direction vector V of each cooling hole 108 is directed at an angle to the cold side 110 (e.g., at an angle between 5-30 degrees to the gas-path hot side 112 surface; FIG. 14) and to generally follow the respective heat transfer rib 150. Due to the fluid and varying nature of the heat transfer ribs 150, a parametric spline is used to define their path on the cold side 110. This spline is typically defined using a number of points that are coincident on the cold side 110. The spline is basically just a line that connects the first point through the N'th point. This ordering of points (from first to last) defining the spline can then be used to calculate a 'running vector' along the spline that locally points to where the spline is headed next. The holes 108 are then aligned to where their entrance and exit 'ride' along the spline to the heat transfer rib 150 (FIG. 16). The holes 108 may be as closely aligned with the respective heat transfer rib 150 to provide a conduction benefit from the through hole 108 flow.

The multiple of heat transfer ribs 150 and the cooling holes 108 therethrough augments the convective cooling of the liner panels by an increase in the cold side 110 surface area. The heat transfer ribs 150 also provide a greater thickness for the cooling holes 108 to project through. This allows for a higher convective area, and increases the total heat flux through the liner panel. This increase in overall heat flux to the cooling air reduces the liner panel temperature on the order of, in one example, about 150 degree Fahrenheit. (66 degrees Celsius).

The heat transfer ribs 150 may receive a coating that increases the oxidation life. That is, the cold side 110 and the heat transfer ribs 150 of each liner panel of the liner panel array may be coated to provide oxidation and corrosion resistance, and/or other capabilities required to survive in a high-temperature environment. The hot gas path may be a thermal barrier coating (TBC) that includes a bond coat and a top coat. The bond coat, in one non-limiting example, may be a nickel-based alloy material, while the top coat may be a ceramic material that is applied via a plasma or other spray coating system. In some non-limiting embodiments, the top coat may be thicker than the bond coat.

The cooling concept takes advantage of one or more cooling apertures which pass cooling air through the heat transfer ribs 150. The heat transfer ribs 150 ameliorate the apparent conflict between cooling air in a combustor environment. The heat transfer ribs 150 augment cooling effectiveness without significant through-wall conduction losses. This design balances desirable cooling air for cooling the combustor walls; while preventing excessive NOX emissions, reduces emissions, increases durability and time-on-wing for improved reliability.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for a combustor of a gas turbine engine, the liner panel comprising:
a multiple of heat transfer ribs that extend from a cold side of the liner panel, each of the multiple of heat transfer ribs comprising a respective multiple of cooling holes that extend therethrough, each cooling hole of the respective multiple of cooling holes for each of the multiple of heat transfer ribs define a direction vector directed at an angle to penetrate a hot side and the cold side, the direction vector of each cooling hole aligned with the respective heat transfer rib, and wherein the multiple of heat transfer ribs avoids cold side structures.

2. The liner panel as recited in claim 1, wherein the multiple of heat transfer ribs are located in response to a pressure field, the multiple of heat transfer ribs flow with respect to the pressure field, the higher the pressure, the greater the number of heat transfer ribs.

3. The liner panel as recited in claim 1, wherein the multiple of heat transfer ribs are located in response to a pressure field on a hot side of the liner panel the multiple of heat transfer ribs flow with respect to the pressure field, the higher the pressure, the greater the number of heat transfer ribs.

4. The liner panel as recited in claim 1, wherein the cold side structures comprise a mount stud.

5. The liner panel as recited in claim 1, wherein the multiple of heat transfer ribs form a semi-circular pattern around a mount stud.

6. The liner panel as recited in claim 1, wherein the multiple of heat transfer ribs form a converging pattern downstream of a first mount stud.

7. The liner panel as recited in claim 6, wherein the converging pattern converges between two mount studs.

8. The liner panel as recited in claim 7, wherein the converging pattern is located on both sides of a semi-circular pattern around a mount stud.

9. The liner panel as recited in claim 1, wherein each of the multiple of heat transfer ribs are about 0.040 (1 mm) in width.

10. The liner panel as recited in claim 1, wherein each of the multiple of heat transfer ribs are about 0.033 inches (0.84 mm) in height.

11. The liner panel as recited in claim 1, wherein each of the multiple of heat transfer ribs are spaced about 0.040 (1 mm) center to center.

12. A wall assembly within a gas turbine engine comprising:
a support shell;
a liner panel mounted to the support shell via a multiple of studs that extend from a cold side of the liner panel; and
a multiple of heat transfer ribs located in at least one discrete area on a cold side of the liner panel, each of the multiple of heat transfer ribs comprising a respective multiple of cooling holes that extend therethrough, each cooling hole of the respective multiple of cooling holes for each of the multiple of heat transfer ribs define a direction vector directed at an angle to penetrate a hot side and the cold side, each cooling hole of the respective multiple of cooling holes aligned with the respective heat transfer rib, wherein the multiple of heat transfer ribs form a semi-circular pattern around a mount stud, and wherein the multiple of heat transfer ribs form a converging pattern downstream of the mount stud, the converging pattern converges between two downstream mount studs.

13. The assembly as recited in claim 12, wherein the converging pattern is located adjacent to the semi-circular pattern.

* * * * *